(12) United States Patent
Wittkopp et al.

(10) Patent No.: US 8,858,386 B2
(45) Date of Patent: Oct. 14, 2014

(54) MULTI-SPEED TRANSMISSION

(75) Inventors: Scott H. Wittkopp, Ypsilanti, MI (US);
Andrew W. Phillips, Rochester, MI (US); James M. Hart, Belleville, MI (US); Edward W. Mellet, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 333 days.

(21) Appl. No.: 13/041,751

(22) Filed: Mar. 7, 2011

(65) Prior Publication Data

US 2012/0231920 A1  Sep. 13, 2012

(51) Int. Cl.
*F16H 3/62* (2006.01)
*F16H 3/44* (2006.01)
*F16H 3/66* (2006.01)

(52) U.S. Cl.
CPC ........ *F16H 3/666* (2013.01); *F16H 2200/2012* (2013.01); *F16H 2003/442* (2013.01); *F16H 2200/2046* (2013.01); *F16H 2200/0065* (2013.01)
USPC .............................. 475/275; 475/276; 475/280

(58) Field of Classification Search
CPC ............... F16H 3/44; F16H 3/62; F16H 3/64; F16H 3/66; F16H 3/663
USPC .......................... 475/275–293, 303, 311–328
See application file for complete search history.

(56) References Cited

U.S. PATENT DOCUMENTS

| | | | |
|---|---|---|---|
| 3,971,268 A * | 7/1976 | Murakami et al. ............ | 475/276 |
| 6,176,803 B1 | 1/2001 | Meyer et al. | |
| 6,984,187 B2 | 1/2006 | Biermann | |
| 7,364,527 B2 * | 4/2008 | Klemen ........................ | 475/290 |
| 8,353,801 B2 * | 1/2013 | Hart et al. ..................... | 475/276 |
| 2007/0072732 A1 * | 3/2007 | Klemen ........................ | 475/280 |
| 2008/0020890 A1 * | 1/2008 | Shim ............................. | 475/276 |
| 2009/0118058 A1 * | 5/2009 | Suh ............................... | 475/275 |

* cited by examiner

*Primary Examiner* — Tisha Lewis

(57) ABSTRACT

A transmission includes an input and output member, four planetary gear sets each having first, second and third members, five interconnecting members continuously interconnecting members of the four planetary gear sets and six torque transmitting mechanisms selectively engageable to interconnect one of the first members, second members, and third members with at least one of another of the first members, second members, third members, and a stationary member. The torque transmitting mechanisms are selectively engageable in combinations of at least two to establish at least nine forward speed ratios and at least one reverse speed ratio between the input member and the output member.

26 Claims, 4 Drawing Sheets

| Gear State | Torque Transmitting Mechanisms | | | | | |
|---|---|---|---|---|---|---|
| | 124, 224, 324, 424, 524 | 126, 226, 326, 426, 526 | 128, 228, 328, 428, 528 | 130, 230, 330, 430, 530 | 132, 232, 332, 432, 532 | 134, 234, 334, 434, 534 |
| Rev | X | | | X | | |
| N | | | | O | | |
| 1st | | X | | X | | |
| 2nd | | | | X | | X |
| 3rd | | X | | | | X |
| 4th | | | X | | | X |
| 5th | X | | | | | X |
| 6th | | | | | X | X |
| 7th | X | | | | X | |
| 8th | | | X | | X | |
| 9th | | X | | | X | |

X = On - Engaged Carrying Torque
O = On - Engaged Carrying Torque

*Fig-7*

MULTI-SPEED TRANSMISSION

FIELD

The invention relates generally to a multiple speed transmission having a plurality of planetary gear sets and a plurality of torque transmitting mechanisms, and more particularly to a transmission having nine speeds, four planetary gear sets and a plurality of torque transmitting mechanisms.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, first, second, third and fourth planetary gear sets each having first, second and third members. A first interconnecting member continuously interconnects one of the members of the first planetary gear set with one of the members of the second planetary gear set. A second interconnecting member continuously interconnects another one of the members of the first planetary gear set with another one of the members of the second planetary gear set. A third interconnecting member continuously interconnects the second member of the third planetary gear set with the second member of the fourth planetary gear set. A fourth interconnecting member continuously interconnects the third member of the third planetary gear set with the first member of the fourth planetary gear set. A fifth interconnecting member continuously interconnects at least one member of the first and second planetary gear sets with the first member of the third planetary gear set. Six torque transmitting mechanisms are each selectively engageable to interconnect one of the first members, second members, and third members with at least one of another of the first members, second members, third members, and a stationary member. The torque transmitting mechanisms are selectively engageable in combinations of at least two to establish at least nine forward speed ratios and at least one reverse speed ratio between the input member and the output member.

In another example of the present invention, the input member is continuously interconnected with at least one of the first and third members of the first and second planetary gear sets and the output member is continuously interconnected with the third interconnecting member.

In yet another example of the present invention, a first of the six torque transmitting mechanisms is selectively engageable to interconnect at least one of the first member of the first planetary gear set and the first member of the second planetary gear set with the stationary member.

In yet another example of the present invention, a second of the six torque transmitting mechanisms is selectively engageable to interconnect the third member of the fourth planetary gear set with the stationary member.

In yet another example of the present invention, a third of the six torque transmitting mechanisms is selectively engageable to interconnect the third member of the fourth planetary gear set with the input member.

In yet another example of the present invention, a fourth of the six torque transmitting mechanisms is selectively engageable to interconnect at least one of the third member of the third planetary gear set and the first member of the fourth planetary gear set with the input member.

In yet another example of the present invention, a fifth of the six torque transmitting mechanisms is selectively engageable to interconnect at least one of the second member of the first planetary gear set, the second member of the second planetary gear set, the third member of the second planetary gear set and the third member of the first planetary gear set with the stationary member.

In yet another example of the present invention, a sixth of the six torque transmitting mechanisms is selectively engageable to interconnect at least one of the third member of the second planetary gear set, the first member of the third planetary gear set, the third member of the first planetary gear set, the second member of the first planetary gear set and the second member of the second planetary gear set with the stationary member.

In yet another example of the present invention, each of the first members are sun gear members, each of the second members are planet carrier members and each of the third members are ring gear members.

In yet another example of the present invention, each of the first members of the first and third planetary gear sets are sun gear members, each of the third members of the second and fourth planetary gear sets are ring gear members, each of the third members of the first and third planetary gear sets are combined with each of the first members of the second and fourth planetary gear sets to form a sun-ring combination gear member and each of the second members of the planetary gear sets are planet carrier members.

In yet another example of the present invention, each of the first members of the first, second and third planetary gear sets are sun gear members, each of the third members of the first, second and fourth planetary gear sets are ring gear members, the third member of the third planetary gear set is combined with the first member of the fourth planetary gear set to form a sun-ring combination gear member and each of the second members of the planetary gear sets are planet carrier members.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 7 is a truth table presenting the state of engagement of the various torque transmitting mechanisms in each of the available forward and reverse speeds or gear ratios of the transmission illustrated in FIGS. 1-6.

DETAILED DESCRIPTION

The following description is merely exemplary in nature and is not intended to limit the present disclosure, application, or uses.

At the outset, it should be appreciated that in the particular examples provided, the automatic transmissions of the present invention have an arrangement of permanent mechanical connections between the elements of the four planetary gear sets. For example, a first component or element of a first planetary gear set is permanently coupled to a first component or element of a second planetary gear set. A second component or element of the first planetary gear set is permanently coupled to a second component or element of the second planetary gear set. A first component or element of a third planetary gear set is permanently coupled to a first component or element of a fourth planetary gear set. A second component or element of a third planetary gear set is permanently coupled to a second component or element of a fourth planetary gear set. Finally, a third component or element of the second planetary gear set is permanently coupled to a third component or element of the third planetary gear set.

Figure 1:
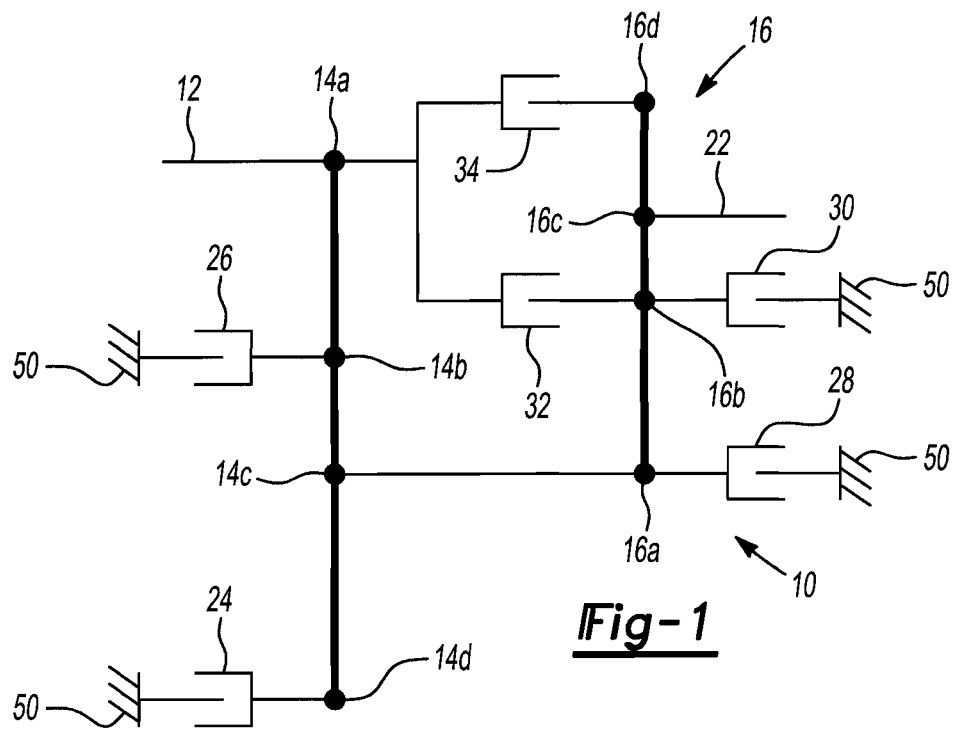
FIG. 1 is a lever diagram of an embodiment of a nine speed transmission according to the present invention.

Referring now to FIG. 1, an example of a nine speed transmission is illustrated in a lever diagram format in accordance with the present invention. A lever diagram is a schematic representation of the components of a mechanical device such as an automatic transmission. In a lever diagram, a single lever may represent a single planetary gear set having three basic mechanical components: a sun gear, a ring gear and a planet carrier member. However, a lever may also represent a pair of planetary gear sets wherein the three basic mechanical components of the planetary gear set or the shared mechanical components between the paired planetary gear sets are each represented by a node. In this case, a single lever contains four nodes. Two of the nodes each represent either a mechanical component that is shared between the two planetary gear sets or a mechanical component of one of the paired gear sets that is interconnected to a mechanical component of the other of the paired gear sets. One of the nodes is the sun gear, ring gear or planet carrier of one of the paired planetary gear sets. Finally, one of the nodes is the sun gear, ring gear or planet carrier of the other of the paired planetary gear sets. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting mechanisms such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

With continuing reference to FIG. 1, transmission 10 includes an input shaft or member 12, a first planetary gear set pair 14 having four nodes: a first node 14A, a second node 14B, a third node 14C and a fourth node 14D, a second planetary gear set pair 16 having four nodes: a first node 16A, a second node 16B, a third node 16C, and a fourth node 16D and an output shaft or member 22.

In the example of the present invention shown in FIG. 1 the first node 14A of the first planetary gear set pair 14 is coupled to the input shaft or member 12. The third node 14C of the first planetary gear set pair 14 is coupled to the first node 16A of the second planetary gear set pair 16. The third node 16C of the second planetary gear set pair 16 is coupled to the output shaft or member 22.

The example of the transmission 10 of FIG. 1 includes a first brake 24 selectively connecting the fourth node 14D of the first planetary gear set pair 14 with a stationary member 50. A second brake 26 selectively connects the second node 14B of the first planetary gear set pair 14 with the stationary member 50. A third brake 28 selectively connects the first node 16A of the second planetary gear set pair 16 with the stationary member 50. A fourth brake 30 selectively connects the second node 16B of the second planetary gear set pair 16 with the stationary member 50. A first clutch 32 selectively connects the first node 14A of the first planetary gear set pair 14 with the second node 16B of the second planetary gear set pair 16. A second clutch 34 selectively connects the first node 14A of the first planetary gear set pair 16 with the third node 16D of the second planetary gear set pair 16.

Referring now to FIGS. 2-6, five stick diagrams each present a schematic layout of an example of the nine speed transmission 100, 200, 300, 400, 500 according to the present invention. The clutches, brakes, and couplings are correspondingly presented whereas the nodes of the planetary gear set pairs now appear as components of single planetary gear sets such as sun gear members, ring gear members, sun-ring combination gear members, interconnecting members, planet gear members and planet gear carrier members. Embodiments of the nine speed transmissions 110, 210 shown in FIGS. 2 and 3 include pairs of planetary gear sets that are stacked upon each other so that they share a sun-ring combination gear between an inner planetary gear set and an outer planetary gear set. The sun-ring combination gear member has an inner surface including gear teeth that mesh with the pinion gears of the inner planetary gear set. The outer surface of the sun-ring combination gear member also includes gear teeth that mesh with the pinion gears of the outer planetary gear set. The sun-ring combination gear member may be a single member or multiple members, however, the function of the sun-ring combination gear member is that of at least a sun gear, a ring gear and an interconnecting member.

Figure 2:
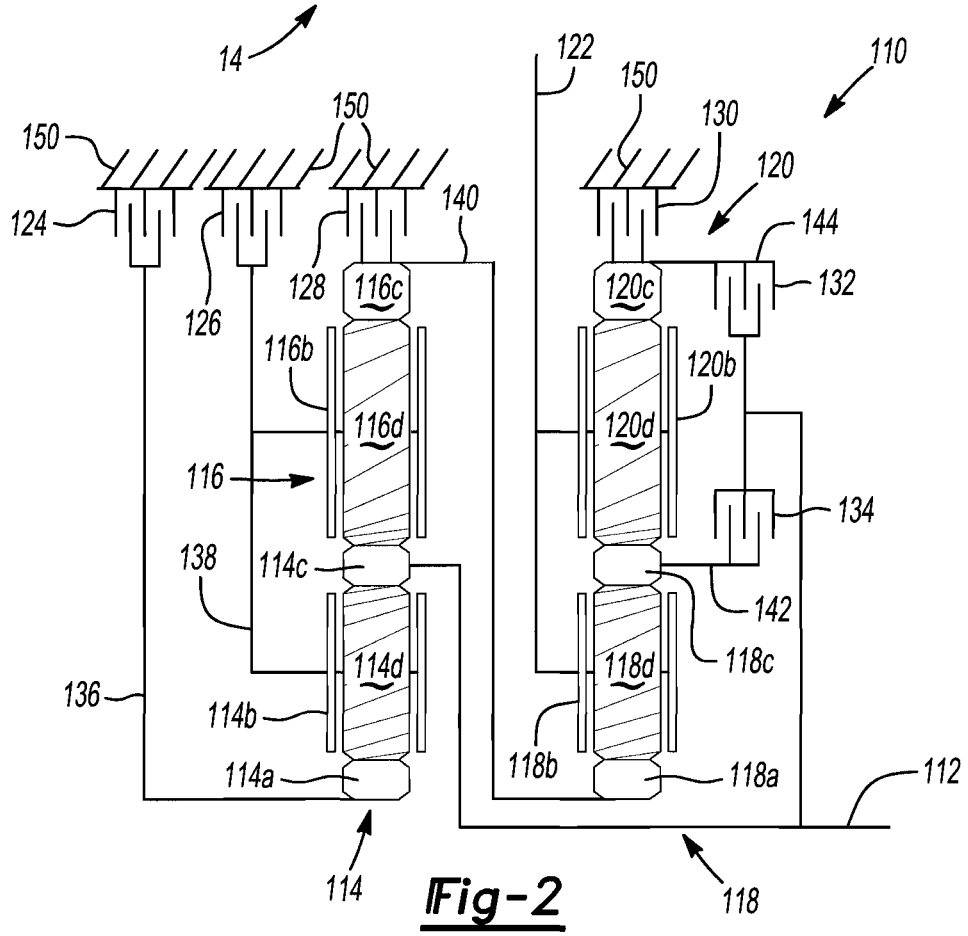
FIG. 2 is a diagrammatic view of an embodiment of a nine speed transmission according to the present invention.

Referring now to FIG. 2, the first planetary gear set 114 of transmission 110, includes a sun gear member 114A, a sun-ring combination gear member 114C, and a planet gear carrier member 114B that rotatably supports a set of planet gears 114D (only one of which is shown). The sun gear member 114A is connected for common rotation with a first shaft or interconnecting member 136. The sun-ring combination gear member 114C is connected for common rotation with an input shaft or member 112. The planet gear carrier member 1148 is connected for common rotation with a second shaft or interconnecting member 138. The planet gears 114D are each configured to intermesh with both of the sun gear member 114A and the sun-ring combination gear member 114C.

The second planetary gear set 116 of transmission 110 includes the sun-ring combination gear member 114C, a ring gear member 116C, and a planet gear carrier member 116B that rotatably supports a set of planet gears 116D (only one of which is shown). The sun-ring combination gear member 114C is shared with the first planetary gear set 114. The ring gear member 116C is connected for common rotation with a third shaft or interconnecting member 140. The planet carrier member 116B is connected for common rotation with the second shaft or interconnecting member 138. The planet gears 116D are each configured to intermesh with both of the sun-ring combination gear member 114C and the ring gear member 116C.

The third planetary gear set 118 of transmission 110 includes a sun gear member 118A, a sun-ring combination gear member 118C, and a planet gear carrier member 118B that rotatably supports a set of planet gears 118D (only one of which is shown). The sun gear member 118A is connected for common rotation with the third shaft or interconnecting member 140. The sun-ring combination gear member 118C is connected for common rotation with a fourth shaft or interconnecting member 142. The planet carrier member 118B is connected for common rotation with an output shaft or member 122. The planet gears 118D are each configured to intermesh with both of the sun gear member 118A and the sun-ring combination gear member 118C.

The fourth planetary gear set 120 of transmissions 110 includes the sun-ring combination gear member 118C, a ring gear member 120C, and a planet gear carrier member 120B that rotatably supports a set of planet gears 120D (only one of which is shown). The sun-ring combination gear member 118C is shared with the third planetary gear set 118. The ring gear member 120C is connected for common rotation with a fifth shaft or interconnecting member 144. The planet carrier member 120B is connected for common rotation with the output shaft or member 122. The planet gears 120D are each configured to intermesh with both of the sun-ring combination gear member 118C and the ring gear member 120C.

The input shaft or member 112 is preferably continuously connected to an engine (not shown) or to a turbine of a torque converter (not shown). The output shaft or member 122 is preferably continuously connected with the final drive unit or transfer case (not shown).

The torque transmitting mechanisms or brakes 124, 126, 128, 130 and clutches 132, 134 allow for selective interconnection of the shafts or interconnecting members, members of the planetary gear sets and the housing. For example, a first brake 124 is selectively engageable to interconnect the first shaft or interconnecting member 136 with a stationary member or transmission housing 150. A second brake 126 is selectively engageable to interconnect the second shaft or interconnecting member 138 with the stationary member or transmission housing 150. A third brake 128 is selectively engageable to interconnect the third shaft or interconnecting member 140 with the stationary member or transmission housing 150. A fourth brake 130 is selectively engageable to interconnect the fifth shaft or interconnecting member 144 with the stationary member or transmission housing 150. A first clutch 132 is selectively engageable to interconnect the fifth shaft or interconnecting member 144 with the input shaft or member 112. The second clutch 134 is selectively engageable to interconnect the fourth shaft or interconnecting member 142 with the input shaft or member 112.

Referring now to FIGS. 2 and 7, the operation of the embodiment of the nine speed transmission 110 will be described. It will be appreciated that the transmission 110 is capable of transmitting torque from the input shaft or member 112 to the output shaft or member 122 in at least nine forward speed or torque ratios and at least one reverse speed or torque ratio. Each forward and reverse speed or torque ratio is attained by engagement of one or more of the torque transmitting mechanisms (i.e. first brake 124, second brake 126, third brake 128, fourth brake 130, first clutch 132, and second clutch 134), as will be explained below. FIG. 7 is a truth table presenting the various combinations of torque transmitting mechanisms that are activated or engaged to achieve the various gear states. Gear ratios are achievable depending on the gear diameter, gear teeth count and gear configuration selected. The truth table of FIG. 7 is applicable to each of the transmissions 110-510 shown in FIGS. 2-6.

To establish reverse gear, the first brake 124 and the fourth brake 130 are engaged or activated. The first brake 124 connects the first shaft or interconnecting member 136 with the stationary member or transmission housing 150 in order to prevent the first shaft or interconnecting member 136 and therefore the sun gear member 114A of the first planetary gear set 114 from rotating relative to the transmission housing 150. The fourth brake 130 connects the fifth shaft or interconnecting member 144 with the stationary member or transmission housing 150 in order to prevent the fifth shaft or interconnecting member 144 and therefore the ring gear member 120C of the fourth planetary gear set 120 from rotating relative to the transmission housing 150. Likewise, the nine forward ratios are achieved through different combinations of clutch and brake engagement, as shown in FIG. 7.

Figure 3:
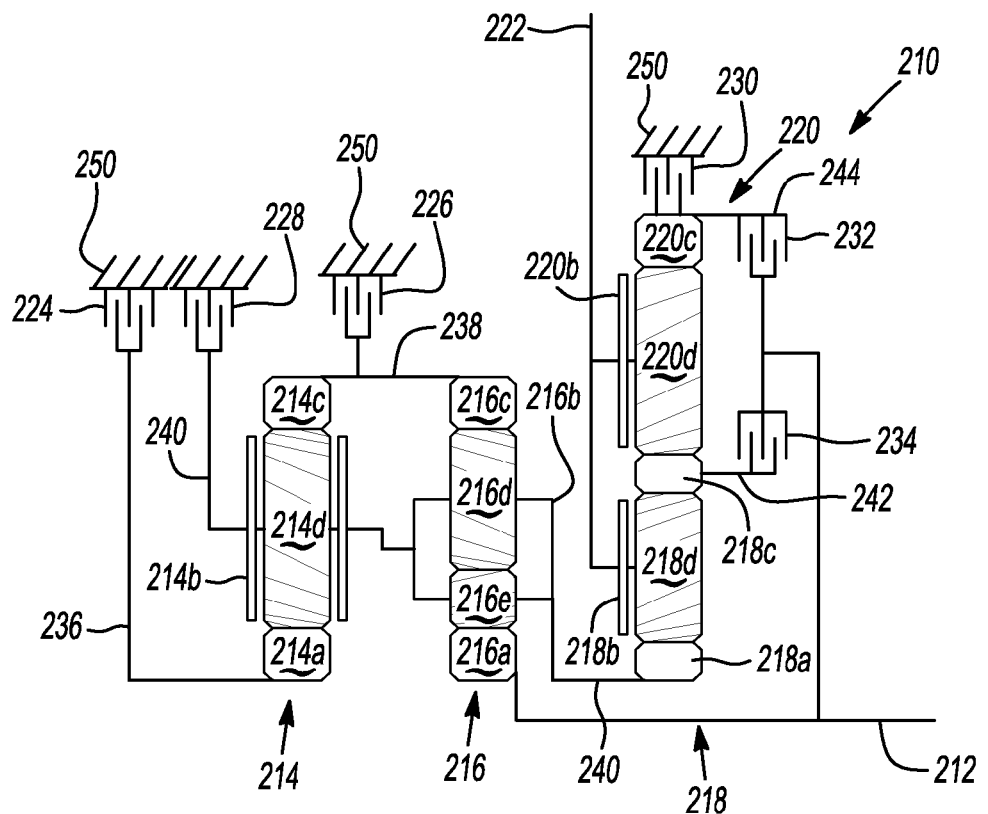
FIG. 3 is a diagrammatic view of another embodiment of a nine speed transmission according to the present invention.

Referring now to FIG. 3, the first planetary gear set 214 of transmission 210, includes a sun gear member 214A, a ring gear member 214C, and a planet gear carrier member 214B that rotatably supports a set of planet gears 214D (only one of which is shown). The sun gear member 214A is connected for common rotation with a first shaft or interconnecting member 236. The ring gear member 214C is connected for common rotation with a second shaft or interconnecting member 238. The planet gear carrier member 214B is connected for common rotation with a third shaft or interconnecting member 240. The planet gears 214D are each configured to intermesh with both of the sun gear member 214A and the ring gear member 214C.

The second planetary gear set 216 of transmission 210 includes a sun gear member 216A, a ring gear member 216C, and a planet gear carrier member 216B that rotatably supports a first set of planet gears 216D and a second set of planet gears 216E (only one of each set is shown). The sun gear member 216A is connected for common rotation with the input shaft or member 212. The ring gear member 216C is connected for common rotation with the second shaft or interconnecting member 238. The planet carrier member 216B is connected for common rotation with the third shaft or interconnecting member 240. The first set of planet gears 216D are each configured to intermesh with both of the sun gear member 216A and the second set of planet gears 216E. The second set of planet gears 216E are each configured to intermesh with both the first set of plant gears 216D and the ring gear member 216C.

The third planetary gear set 218 of transmission 210 includes a sun gear member 218A, a sun-ring combination gear member 218C, and a planet gear carrier member 218B that rotatably supports a set of planet gears 218D (only one of which is shown). The sun gear member 218A is connected for common rotation with the third shaft or interconnecting member 240. The sun-ring combination gear member 218C is connected for common rotation with a fourth shaft or interconnecting member 242. The planet carrier member 218B is connected for common rotation with an output shaft or member 222. The planet gears 218D are each configured to intermesh with both of the sun gear member 218A and the sun-ring combination gear member 218C.

The fourth planetary gear set 220 of transmissions 210 includes the sun-ring combination gear member 218C, a ring gear member 220C, and a planet gear carrier member 220B that rotatably supports a set of planet gears 220D (only one of which is shown). The sun-ring combination gear member 220A is shared with the third planetary gear set 218. The ring gear member 220C is connected for common rotation with a fifth shaft or interconnecting member 244. The planet carrier member 220B is connected for common rotation with the output shaft or member 222. The planet gears 220D are each configured to intermesh with both of the sun-ring combination gear member 218C and the ring gear member 220C.

The input shaft or member 212 is preferably continuously connected to an engine (not shown) or to a turbine of a torque converter (not shown). The output shaft or member 222 is preferably continuously connected with the final drive unit or transfer case (not shown).

The torque transmitting mechanisms or brakes 224, 226, 228, 230 and clutches 232, 234 allow for selective interconnection of the shafts or interconnecting members, members of the planetary gear sets and the housing. For example, a first brake 224 is selectively engageable to interconnect the first shaft or interconnecting member 236 with a stationary member or transmission housing 150. A second brake 226 is selectively engageable to interconnect the second shaft or interconnecting member 238 with the stationary member or transmission housing 150. A third brake 228 is selectively engageable to interconnect the third shaft or interconnecting member 240 with the stationary member or transmission housing 150. A fourth brake 230 is selectively engageable to interconnect the fifth shaft or interconnecting member 244 with the stationary member or transmission housing 150. A first clutch 232 is selectively engageable to interconnect the fifth shaft or interconnecting member 244 with the input shaft or member 212. The second clutch 234 is selectively engageable to interconnect the fourth shaft or interconnecting member 242 with the input shaft or member 212.

Referring now to FIGS. 3 and 7, the operation of the embodiment of the nine speed transmission 220 will be described. It will be appreciated that the transmission 220 is capable of transmitting torque from the input shaft or member 212 to the output shaft or member 222 in at least nine forward speed or torque ratios and at least one reverse speed or torque ratio. Each forward and reverse speed or torque ratio is attained by engagement of one or more of the torque transmitting mechanisms (i.e. first brake 224, second brake 226, third brake 228, fourth brake 230, first clutch 232, and second clutch 234), as will be explained below. FIG. 7 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 224 and the fourth brake 230 are engaged or activated. The first brake 224 connects the first shaft or interconnecting member 236 with the stationary member or transmission housing 250 in order to prevent the first shaft or interconnecting member 236 and therefore the sun gear member 214A of the first planetary gear set 214 from rotating relative to the transmission housing 250. The fourth brake 230 connects the fifth shaft or interconnecting member 244 with the stationary member or transmission housing 250 in order to prevent the fifth shaft or interconnecting member 244 and therefore the ring gear member 220C of the fourth planetary gear set 220 from rotating relative to the transmission housing 250. Likewise, the nine forward ratios are achieved through different combinations of clutch and brake engagement, as shown in FIG. 7.

Figure 4:
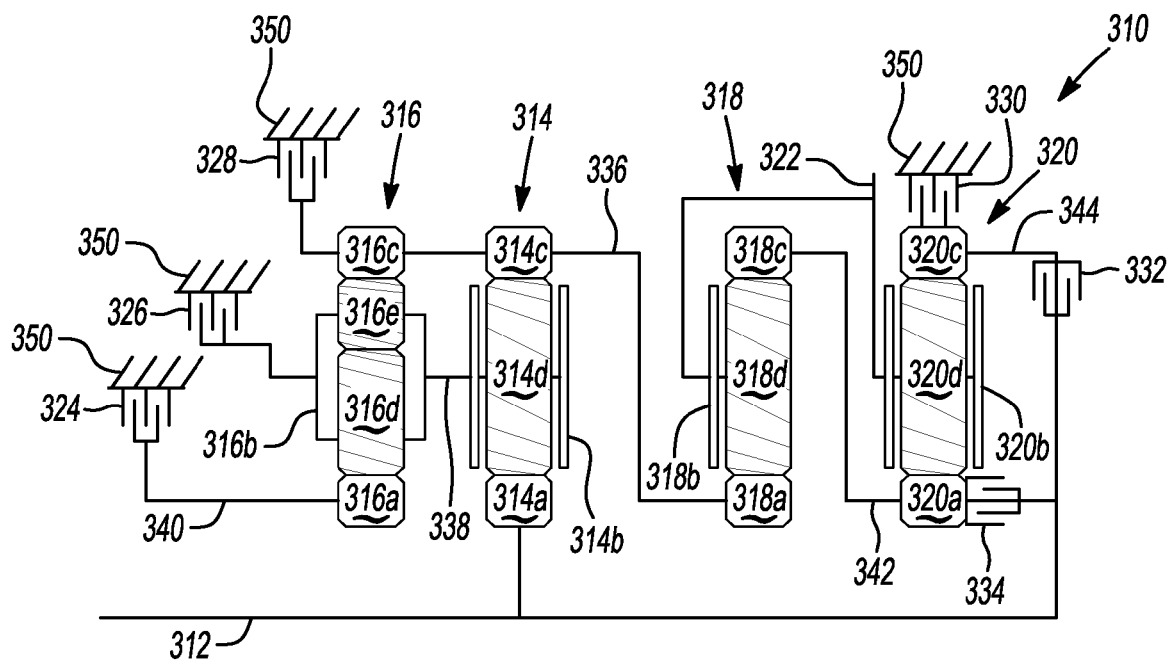
FIG. 4 is a diagrammatic view of yet another embodiment of a nine speed transmission according to the present invention.

Referring now to FIG. 4, the first planetary gear set 314 of transmission 310, includes a sun gear member 314A, a ring gear member 314C, and a planet gear carrier member 314B that rotatably supports a set of planet gears 314D (only one of which is shown). The sun gear member 314A is connected for common rotation with an input shaft or member 312. The ring gear member 314C is connected for common rotation with a first shaft or interconnecting member 336. The planet gear carrier member 314B is connected for common rotation with a second shaft or interconnecting member 338. The planet gears 314D are each configured to intermesh with both of the sun gear member 314A and the ring gear member 314C.

The planetary gear set 316 of transmission 310 includes a sun gear member 316A, a ring gear member 316C, and a planet gear carrier member 3168 that rotatably supports a first set of planet gears 316D and a second set of planet gears 316E (only one of each set is shown). The sun gear member 316A is connected for common rotation with a third shaft or interconnecting member 340. The ring gear member 316C is connected for common rotation with the first shaft or interconnecting member 336. The planet gear carrier member 316B is connected for common rotation with the second shaft or interconnecting member 338. The first set of planet gears 316D are each configured to intermesh with both of the sun gear member 316A and the second set of planet gears 316E. The second set of planet gears 316E are each configured to intermesh with both the first set of plant gears 316D and the ring gear member 316C.

The third planetary gear set 318 of transmission 310, includes a sun gear member 318A, a ring gear member 318C, and a planet gear carrier member 318B that rotatably supports a set of planet gears 318D (only one of which is shown). The sun gear member 318A is connected for common rotation with the first shaft or interconnecting member 336. The ring gear member 318C is connected for common rotation with a fourth shaft or interconnecting member 342. The planet gear carrier member 318B is connected for common rotation with an output shaft or member 322. The planet gears 318D are each configured to intermesh with both of the sun gear member 318A and the ring gear member 318C.

The fourth planetary gear set 320 of transmission 310, includes a sun gear member 320A, a ring gear member 320C, and a planet gear carrier member 320B that rotatably supports a set of planet gears 320D (only one of which is shown). The sun gear member 320A is connected for common rotation with the fourth shaft or interconnecting member 342. The ring gear member 320C is connected for common rotation with a fifth shaft or interconnecting member 344. The planet gear carrier member 320B is connected for common rotation with an output shaft or member 322. The planet gears 320D are each configured to intermesh with both of the sun gear member 320A and the ring gear member 320C.

The input shaft or member 312 is preferably continuously connected to an engine (not shown) or to a turbine of a torque converter (not shown). The output shaft or member 322 is preferably continuously connected with the final drive unit or transfer case (not shown).

The torque transmitting mechanisms or brakes 324, 326, 328, 330 and clutches 332, 334 allow for selective interconnection of the shafts or interconnecting members, members of the planetary gear sets and the housing. For example, a first brake 324 is selectively engageable to interconnect the third shaft or interconnecting member 340 with a stationary member or transmission housing 350. A second brake 326 is selectively engageable to interconnect the second shaft or interconnecting member 338 with the stationary member or transmission housing 350. A third brake 328 is selectively engageable to interconnect the first shaft or interconnecting member 336 with the stationary member or transmission housing 350. A fourth brake 330 is selectively engageable to interconnect the fifth shaft or interconnecting member 344 with the stationary member or transmission housing 450. A first clutch 332 is selectively engageable to interconnect the fifth shaft or interconnecting member 344 with the input shaft or member 312. The second clutch 334 is selectively engageable to interconnect the fourth shaft or interconnecting member 342 with the input shaft or member 312.

Referring now to FIGS. 4 and 7, the operation of the embodiment of the nine speed transmission 310 will be described. It will be appreciated that the transmission 310 is capable of transmitting torque from the input shaft or member 312 to the output shaft or member 322 in at least nine forward speed or torque ratios and at least one reverse speed or torque ratio. Each forward and reverse speed or torque ratio is attained by engagement of one or more of the torque transmitting mechanisms (i.e. first brake 324, second brake 326, third brake 328, fourth brake 330, first clutch 332, and second clutch 334), as will be explained below. FIG. 7 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 324 and the fourth brake 330 are engaged or activated. The first brake 324 connects the third shaft or interconnecting member 340 with the stationary member or transmission housing 350 in order to prevent the third shaft or interconnecting member 340 and therefore the sun gear member 316A of the second planetary gear set 316 from rotating relative to the transmission housing 350. The fourth brake 330 connects the fifth shaft or interconnecting member 344 with the stationary member or transmission housing 350 in order to prevent the fifth shaft or interconnecting member 344 and therefore the ring gear member 320C of the fourth planetary gear set 320 from rotating relative to the transmission housing 350. Likewise, the nine forward ratios are achieved through different combinations of clutch and brake engagement, as shown in FIG. 7.

Figure 5:
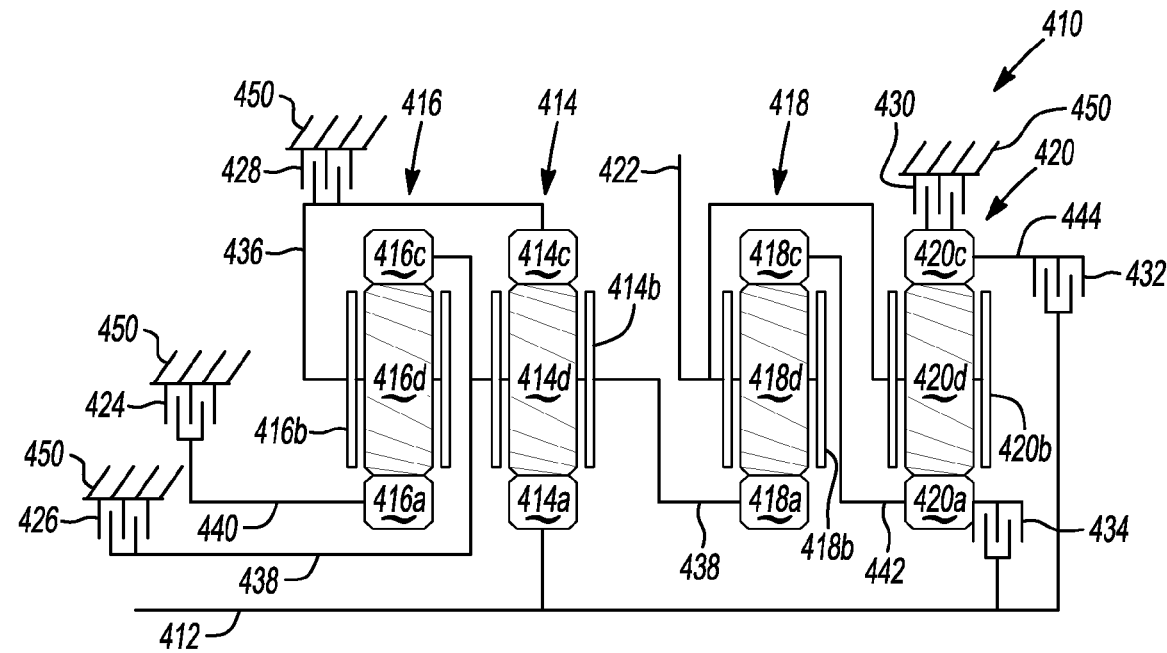
FIG. 5 is a diagrammatic view of yet another embodiment of a nine speed transmission according to the present invention.

Referring now to FIG. 5, the first planetary gear set 414 of transmission 410, includes a sun gear member 414A, a ring gear member 414C, and a planet gear carrier member 414B that rotatably supports a set of planet gears 414D (only one of which is shown). The sun gear member 414A is connected for common rotation with an input shaft or member 412. The ring gear member 414C is connected for common rotation with a first shaft or interconnecting member 436. The carrier member 414B is connected for common rotation with a second shaft or interconnecting member 438. The planet gears 414D are each configured to intermesh with both of the sun gear member 414A and the ring gear member 414C.

The second planetary gear set 416 of transmission 410 includes a sun gear member 416A, a ring gear member 416C, and a planet gear carrier member 416B that rotatably supports a set of planet gears 416D (only one of which is shown). The sun gear member 416A is connected for common rotation with a third shaft or interconnecting member 440. The ring gear member 416C is connected for common rotation with the second shaft or interconnecting member 438. The planet carrier member 416B is connected for common rotation with the first shaft or interconnecting member 436. The planet gears 416D are each configured to intermesh with both of the sun gear member 416A and the ring gear member 416C.

The third planetary gear set 418 of transmission 410, includes a sun gear member 418A, a ring gear member 418C, and a planet gear carrier member 418B that rotatably supports a set of planet gears 418D (only one of which is shown). The sun gear member 418A is connected for common rotation with the second shaft or interconnecting member 438. The ring gear member 418C is connected for common rotation with a fourth shaft or interconnecting member 442. The carrier member 418B is connected for common rotation with an output shaft or member 422. The planet gears 418D are each configured to intermesh with both of the sun gear member 418A and the ring gear member 418C.

The fourth planetary gear set 420 of transmission 410, includes a sun gear member 420A, a ring gear member 420C, and a planet gear carrier member 420B that rotatably supports a set of planet gears 420D (only one of which is shown). The sun gear member 420A is connected for common rotation with the fourth shaft or interconnecting member 442. The ring gear member 420C is connected for common rotation with a fifth shaft or interconnecting member 444. The carrier member 420B is connected for common rotation with an output shaft or member 422. The planet gears 420D are each configured to intermesh with both of the sun gear member 420A and the ring gear member 420C.

The input shaft or member 412 is preferably continuously connected to an engine (not shown) or to a turbine of a torque converter (not shown). The output shaft or member 422 is preferably continuously connected with the final drive unit or transfer case (not shown).

The torque transmitting mechanisms or brakes 424, 426, 428, 430 and clutches 432, 434 allow for selective interconnection of the shafts or interconnecting members, members of the planetary gear sets and the housing. For example, a first brake 424 is selectively engageable to interconnect the third shaft or interconnecting member 440 with a stationary member or transmission housing 450. A second brake 426 is selectively engageable to interconnect the second shaft or interconnecting member 438 with the stationary member or transmission housing 450. A third brake 428 is selectively engageable to interconnect the first shaft or interconnecting member 436 with the stationary member or transmission housing 450. A fourth brake 430 is selectively engageable to interconnect the fifth shaft or interconnecting member 444 with the stationary member or transmission housing 450. A first clutch 432 is selectively engageable to interconnect the fifth shaft or interconnecting member 444 with the input shaft or member 412. The second clutch 434 is selectively engageable to interconnect the fourth shaft or interconnecting member 442 with the input shaft or member 412.

Referring now to FIGS. 5 and 7, the operation of the embodiment of the nine speed transmission 410 will be described. It will be appreciated that the transmission 410 is capable of transmitting torque from the input shaft or member 412 to the output shaft or member 422 in at least nine forward speed or torque ratios and at least one reverse speed or torque ratio. Each forward and reverse speed or torque ratio is attained by engagement of one or more of the torque transmitting mechanisms (i.e. first brake 424, second brake 426, third brake 428, fourth brake 430, first clutch 432, and second clutch 434), as will be explained below. FIG. 7 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 424 and the fourth brake 430 are engaged or activated. The first brake 424 connects the third shaft or interconnecting member 440 with the stationary member or transmission housing 450 in order to prevent the third shaft or interconnecting member 440 and therefore the sun gear member 416A of the second planetary gear set 416 from rotating relative to the transmission housing 450. The fourth brake 430 connects the fifth shaft or interconnecting member 444 with the stationary member or transmission housing 450 in order to prevent the fifth shaft or interconnecting member 444 and therefore the ring gear member 420C of the fourth planetary gear set 420 from rotating relative to the transmission housing 450. Likewise, the nine forward ratios are achieved through different combinations of clutch and brake engagement, as shown in FIG. 7.

Figure 6:
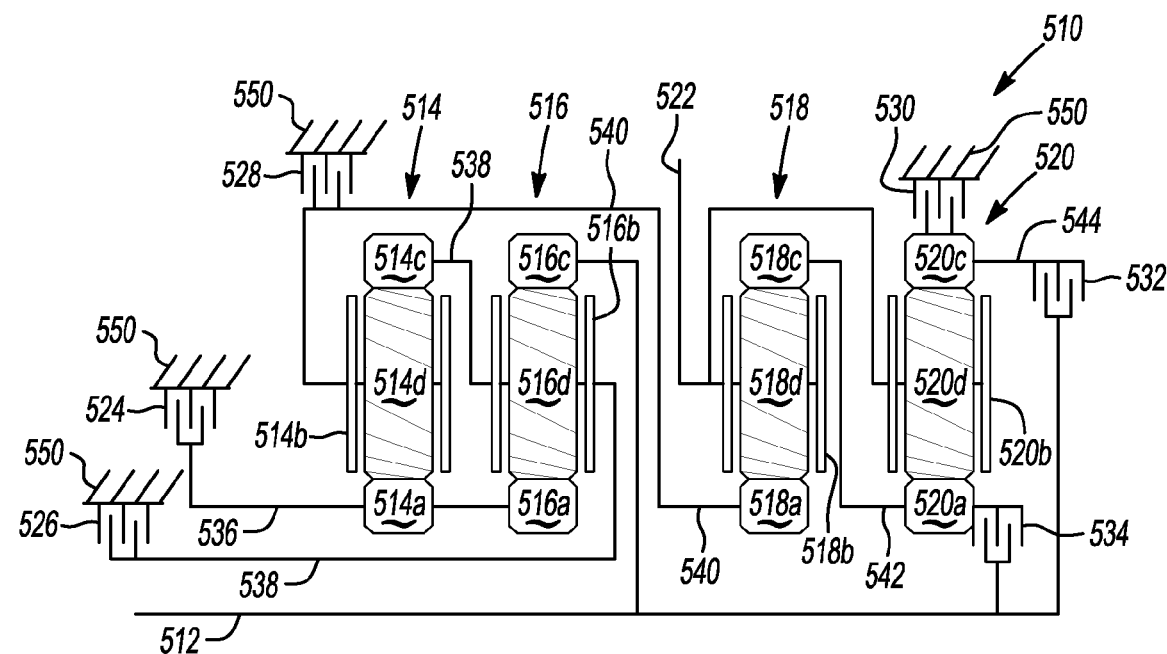
FIG. 6 is a diagrammatic view of yet another embodiment of a nine speed transmission according to the present invention.

Referring now to FIG. 6, the first planetary gear set 514 of transmission 510, includes a sun gear member 514A, a ring gear member 514C, and a planet gear carrier member 514B that rotatably supports a set of planet gears 514D (only one of which is shown). The sun gear member 514A is connected for common rotation with a first shaft or interconnecting member 536. The ring gear member 514C is connected for common rotation with a second shaft or interconnecting member 538. The planet gear carrier member 514B is connected for common rotation with a third shaft or interconnecting member 540. The planet gears 514D are each configured to intermesh with both of the sun gear member 514A and the ring gear member 514C.

The second planetary gear set 516 of transmission 510 includes a sun gear member 516A, a ring gear member 516C, and a planet gear carrier member 516B that rotatably supports a set of planet gears 516D (only one of which is shown). The sun gear member 516A is connected for common rotation with the first shaft or interconnecting member 536. The ring gear member 516C is connected for common rotation with an input shaft or member 512. The planet gear carrier member 516B is connected for common rotation with the second shaft or interconnecting member 538. The planet gears 516D are each configured to intermesh with both of the sun gear member 516A and the ring gear member 516C.

The third planetary gear set 518 of transmission 510, includes a sun gear member 518A, a ring gear member 518C, and a planet gear carrier member 518B that rotatably supports a set of planet gears 518D (only one of which is shown). The sun gear member 518A is connected for common rotation with the third shaft or interconnecting member 540. The ring gear member 518C is connected for common rotation with a fourth shaft or interconnecting member 542. The planet gear carrier member 518B is connected for common rotation with an output shaft or member 522. The planet gears 518D are each configured to intermesh with both of the sun gear member 518A and the ring gear member 518C.

The fourth planetary gear set 520 of transmission 510, includes a sun gear member 520A, a ring gear member 520C, and a planet gear carrier member 520B that rotatably supports a set of planet gears 520D (only one of which is shown). The sun gear member 520A is connected for common rotation with the fourth shaft or interconnecting member 542. The ring gear member 520C is connected for common rotation with a fifth shaft or interconnecting member 544. The planet gear carrier member 520B is connected for common rotation with an output shaft or member 522. The planet gears 520D are each configured to intermesh with both of the sun gear member 520A and the ring gear member 520C.

The input shaft or member 512 is preferably continuously connected to an engine (not shown) or to a turbine of a torque converter (not shown). The output shaft or member 522 is preferably continuously connected with the final drive unit or transfer case (not shown).

The torque transmitting mechanisms or brakes 524, 526, 528, 530 and clutches 532, 534 allow for selective interconnection of the shafts or interconnecting members, members of the planetary gear sets and the housing. For example, a first brake 524 is selectively engageable to interconnect the first shaft or interconnecting member 536 with a stationary member or transmission housing 550. A second brake 526 is selectively engageable to interconnect the second shaft or interconnecting member 538 with the stationary member or transmission housing 550. A third brake 528 is selectively engageable to interconnect the third shaft or interconnecting member 540 with the stationary member or transmission housing 550. A fourth brake 530 is selectively engageable to interconnect the fifth shaft or interconnecting member 544 with the stationary member or transmission housing 550. A first clutch 532 is selectively engageable to interconnect the fifth shaft or interconnecting member 544 with the input shaft or member 512. The second clutch 534 is selectively engageable to interconnect the fourth shaft or interconnecting member 542 with the input shaft or member 512.

Referring now to FIGS. 6 and 7, the operation of the embodiment of the nine speed transmission 510 will be described. It will be appreciated that the transmission 510 is capable of transmitting torque from the input shaft or member 512 to the output shaft or member 522 in at least nine forward speed or torque ratios and at least one reverse speed or torque ratio. Each forward and reverse speed or torque ratio is attained by engagement of one or more of the torque transmitting mechanisms (i.e. first brake 524, second brake 526, third brake 528, fourth brake 530, first clutch 532, and second clutch 534), as will be explained below. FIG. 7 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 524 and the fourth brake 530 are engaged or activated. The first brake 524 connects the first shaft or interconnecting member 536 with the stationary member or transmission housing 550 in order to prevent the first shaft or interconnecting member 536 and therefore the sun gear member 514A of the first planetary gear set 514 from rotating relative to the transmission housing 550. The fourth brake 530 connects the fifth shaft or interconnecting member 544 with the stationary member or transmission housing 550 in order to prevent the fifth shaft or interconnecting member 544 and therefore the ring gear member 520C of the fourth planetary gear set 520 from rotating relative to the transmission housing 550. Likewise, the nine forward ratios are achieved through different combinations of clutch and brake engagement, as shown in FIG. 7.

It will be appreciated that the foregoing explanation of operation and gear states of the nine speed transmissions 110-510 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention.

Such variations are not to be regarded as a departure from the spirit and scope of the invention.

What is claimed is:

1. A transmission comprising:
    an input member;
    an output member;
    first, second, third and fourth planetary gear sets each having first, second and third members, wherein the input member is continuously interconnected with at least one of the first and third members of the first and second planetary gear sets and the output member is continuously interconnected with the second member of the third planetary gear set;
    a first interconnecting member continuously interconnecting one of the members of the first planetary gear set with one of the members of the second planetary gear set;
    a second interconnecting member continuously interconnecting another one of the members of the first planetary gear set with another one of the members of the second planetary gear set;
    a third interconnecting member continuously interconnecting the second member of the third planetary gear set with the second member of the fourth planetary gear set;
    a fourth interconnecting member continuously interconnecting the third member of the third planetary gear set with the first member of the fourth planetary gear set;
    a fifth interconnecting member continuously interconnecting at least one member of the first and second planetary gear sets with the first member of the third planetary gear set; and
    six torque transmitting mechanisms, wherein three of the six torque transmitting mechanisms are each selectively engageable to interconnect the second planetary gear set to a stationary member and three of the six torque transmitting mechanisms are each selectively engageable to interconnect the fourth planetary gear set with the stationary member or the input member, and
    wherein the torque transmitting mechanisms are selectively engageable in combinations of at least two to establish at least nine forward speed ratios and at least one reverse speed ratio between the input member and the output member and the second planetary gear set includes a first and a second set of pinion gears.

2. The transmission of claim 1 wherein a first of the six torque transmitting mechanisms is selectively engageable to interconnect at least one of the first member of the first planetary gear set and the first member of the second planetary gear set with the stationary member.

3. The transmission of claim 2 wherein a second of the six torque transmitting mechanisms is selectively engageable to interconnect the third member of the fourth planetary gear set with the stationary member.

4. The transmission of claim 3 wherein a third of the six torque transmitting mechanisms is selectively engageable to interconnect the third member of the fourth planetary gear set with the input member.

5. The transmission of claim 4 wherein a fourth of the six torque transmitting mechanisms is selectively engageable to interconnect at least one of the third member of the third planetary gear set and the first member of the fourth planetary gear set with the input member.

6. The transmission of claim 5 wherein a fifth of the six torque transmitting mechanisms is selectively engageable to interconnect at least one of the second member of the first planetary gear set, the second member of the second planetary gear set, the third member of the second planetary gear set and the third member of the first planetary gear set with the stationary member.

7. The transmission of claim 6 wherein a sixth of the six torque transmitting mechanisms is selectively engageable to interconnect at least one of the third member of the second planetary gear set, the first member of the third planetary gear set, the third member of the first planetary gear set, the second member of the first planetary gear set and the second member of the second planetary gear set with the stationary member.

8. The transmission of claim 7 wherein each of the first members are sun gear members, each of the second members are planet carrier members and each of the third members are ring gear members.

9. The transmission of claim 7 wherein each of the first members of the first and third planetary gear sets are sun gear members, each of the third members of the second and fourth planetary gear sets are ring gear members, each of the third members of the first and third planetary gear sets are combined with each of the first members of the second and fourth planetary gear sets, respectively, to form a sun-ring combination gear member and each of the second members of the planetary gear sets are planet carrier members.

10. The transmission of claim 7 wherein each of the first members of the first, second and third planetary gear sets are sun gear members, each of the third members of the first, second and fourth planetary gear sets are ring gear members, the third member of the third planetary gear set is combined with the first member of the fourth planetary gear set to form a sun-ring combination gear member and each of the second members of the planetary gear sets are planet carrier members.

11. A transmission comprising:
    an input member;
    an output member;
    first, second, third and fourth planetary gear sets each having first, second and third members wherein the input member is continuously interconnected to the first member of the first planetary gear set and the output member is continuously interconnected with the second member of the third and fourth planetary gear sets;
    a first interconnecting member continuously interconnecting one of the members of the first planetary gear set with one of the members of the second planetary gear set;
    a second interconnecting member continuously interconnecting another one of the members of the first planetary gear set with another one of the members of the second planetary gear set;
    a third interconnecting member continuously interconnecting the second member of the third planetary gear set with the second member of the fourth planetary gear set;
    a fourth interconnecting member continuously interconnecting the third member of the third planetary gear set with the first member of the fourth planetary gear set;
    a fifth interconnecting member continuously interconnecting at least one member of the first and second planetary gear sets with the first member of the third planetary gear set; and
    six torque transmitting mechanisms, wherein three of the six torque transmitting mechanisms are each selectively engageable to interconnect the second planetary gear set to a stationary member and three of the six torque transmitting mechanisms are each selectively engageable to interconnect the fourth planetary gear set with the stationary member or the input member, and wherein the torque transmitting mechanisms are selectively engageable in combinations of at least two to establish at least nine forward speed ratios and at least one reverse speed ratio between the input member and the output member and the second planetary gear set includes a first and a second set of pinion gears.

12. The transmission of claim 11 wherein a first of the six torque transmitting mechanisms is selectively engageable to interconnect at least one of the first member of the first planetary gear set and the first member of the second planetary gear set with the stationary member, a second of the six torque transmitting mechanisms is selectively engageable to interconnect the third member of the fourth planetary gear set with the stationary member, a third of the six torque transmitting mechanisms is selectively engageable to interconnect the third member of the fourth planetary gear set with the input member, a fourth of the six torque transmitting mechanisms is selectively engageable to interconnect at least one of the third member of the third planetary gear set and the first member of the fourth planetary gear set with the input member, a fifth of the six torque transmitting mechanisms is selectively engageable to interconnect at least one of the second member of the first planetary gear set, the second member of the second planetary gear set, the third member of the second planetary gear set and the third member of the first planetary gear set with the stationary member and a sixth of the six torque transmitting mechanisms is selectively engageable to interconnect at least one of the third member of the second planetary gear set, the first member of the third planetary gear set, the third member of the first planetary gear set, the second member of the first planetary gear set and the second member of the second planetary gear set with the stationary member.

13. The transmission of claim 12 wherein the fifth of the six torque transmitting mechanisms is selectively engageable to interconnect the second member of the first planetary gear set and the second member of the second planetary gear set with the stationary member.

14. The transmission of claim 12 wherein the fifth of the six torque transmitting mechanisms is selectively engageable to interconnect the second member of the first planetary gear set and the third member of the second planetary gear set with the stationary member.

15. The transmission of claim 12 wherein the fifth of the six torque transmitting mechanisms is selectively engageable to interconnect the third member of the first planetary gear set and the third member of the second planetary gear set with the stationary member.

16. The transmission of claim 12 wherein the sixth of the six torque transmitting mechanisms is selectively engageable to interconnect the third member of the second planetary gear set and the first member of the third planetary gear set with the stationary member.

17. The transmission of claim 12 wherein a sixth of the six torque transmitting mechanisms is selectively engageable to interconnect the third member of the second planetary gear set and the third member of the first planetary gear set with the stationary member.

18. The transmission of claim 12 wherein a sixth of the six torque transmitting mechanisms is selectively engageable to interconnect the third member of the first planetary gear set and the second member of the second planetary gear set with the stationary member.

19. The transmission of claim 12 wherein a sixth of the six torque transmitting mechanisms is selectively engageable to interconnect the first member of the third planetary gear set and the second member of the first planetary gear set with the stationary member.

20. The transmission of claim 12 wherein the each of the first members are sun gear members, each of the second members are planet carrier members and each of the third members are ring gear members.

21. The transmission of claim 12 wherein:
the input member is continuously interconnected with the third member of the first planetary gear set and the first member of the second planetary gear set; the first interconnecting member continuously interconnects the second member of the first planetary gear set with the second member of the second planetary gear set;
the second interconnecting member continuously interconnects the third member of the first planetary gear set with the first member of the second planetary gear set; and
the fifth interconnecting member continuously interconnects the third member of the second planetary gear set with the first member of the third planetary gear set.

22. The transmission of claim 12 wherein:
the input member is continuously interconnected with the first member of the second planetary gear set;
the first interconnecting member continuously interconnects the second member of the first planetary gear set with the second member of the second planetary gear set;
the second interconnecting member continuously interconnects the third member of the first planetary gear set with the third member of the second planetary gear set; and
the fifth interconnecting member continuously interconnects the second member of the second planetary gear set with the first member of the third planetary gear set.

23. The transmission of claim 12 wherein:
the input member is continuously interconnected with the first member of the first planetary gear set;
the first interconnecting member continuously interconnects the second member of the first planetary gear set with the second member of the second planetary gear set;
the second interconnecting member continuously interconnects the third member of the first planetary gear set with the third member of the second planetary gear set; and
the fifth interconnecting member continuously interconnects the third member of the first planetary gear set with the first member of the third planetary gear set.

24. The transmission of claim 12 wherein:
the input member is continuously interconnected with the first member of the first planetary gear set;
the first interconnecting member continuously interconnects the first member of the second planetary gear set with the third member of the second planetary gear set;
the second interconnecting member continuously interconnects the third member of the first planetary gear set with the second member of the second planetary gear set; and
the fifth interconnecting member continuously interconnects the second member of the first planetary gear set with the first member of the third planetary gear set.

25. The transmission of claim 12 wherein:
the input member is continuously interconnected with the third member of the second planetary gear set;
the first interconnecting member continuously interconnects the first member of the first planetary gear set with the first member of the second planetary gear set;

the second interconnecting member continuously interconnects the third member of the first planetary gear set with the second member of the second planetary gear set; and the fifth interconnecting member continuously interconnects the second member of the first planetary gear set with the first member of the third planetary gear set.

26. The transmission of claim 1 wherein the input member is continuously interconnected with a member of the second planetary gear set and the output member is continuously interconnected with the third interconnecting member.

* * * * *